(12) United States Patent
Chen et al.

(10) Patent No.: US 7,971,321 B2
(45) Date of Patent: Jul. 5, 2011

(54) HINGE AND AN ELECTRONIC DEVICE WITH THE HINGE

(75) Inventors: Wei-Chun Chen, Shulin (TW); Chia-Hsiang Chen, Shulin (TW); Weiming Chen, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 406 days.

(21) Appl. No.: 12/339,699

(22) Filed: Dec. 19, 2008

(65) Prior Publication Data
US 2010/0154169 A1 Jun. 24, 2010

(51) Int. Cl.
*E05D 3/10* (2006.01)
(52) U.S. Cl. .......... 16/367; 162/242; 162/246; 162/296
(58) Field of Classification Search .............. 16/296, 16/229, 233, 286, 310, 364, 362, 242, 243, 16/246, 291, 282, 287, 288, 294, 302, 366–370, 16/266, 380, 303, 250, 304; 455/575.3; 379/433.13; 361/679.06, 679.07, 679.09, 679.27
See application file for complete search history.

(56) References Cited

U.S. PATENT DOCUMENTS

| | | | |
|---|---|---|---|
| 4,570,290 A * | 2/1986 | Anderson | 16/229 |
| 5,007,134 A * | 4/1991 | Stanford | 16/266 |
| 5,077,864 A * | 1/1992 | Kawasaki | 16/278 |
| 6,629,336 B2 * | 10/2003 | Hosaka et al. | 16/327 |
| 6,804,861 B2 * | 10/2004 | Hsu | 16/366 |
| 6,920,668 B2 * | 7/2005 | Hayashi | 16/303 |
| 7,028,373 B2 * | 4/2006 | Harmon et al. | 16/284 |
| 7,047,598 B2 * | 5/2006 | Huang | 16/312 |
| 7,055,219 B2 * | 6/2006 | Shiba | 16/367 |
| 7,150,075 B2 * | 12/2006 | Kato | 16/367 |
| 7,380,314 B2 * | 6/2008 | Hung | 16/367 |
| 7,469,449 B2 * | 12/2008 | Hsu | 16/367 |
| 7,621,020 B2 * | 11/2009 | Hsu et al. | 16/340 |
| 7,706,137 B2 * | 4/2010 | Iijima et al. | 361/679.07 |
| 7,752,711 B1 * | 7/2010 | Chen et al. | 16/347 |
| 2003/0056327 A1 * | 3/2003 | Lin et al. | 16/342 |
| 2004/0107540 A1 * | 6/2004 | Hsu | 16/366 |
| 2005/0102799 A1 * | 5/2005 | Huang | 16/367 |
| 2006/0117528 A1 * | 6/2006 | Duan et al. | 16/303 |
| 2007/0151076 A1 * | 7/2007 | Sato et al. | 16/287 |
| 2008/0034546 A1 * | 2/2008 | Hsu | 16/367 |
| 2008/0034550 A1 * | 2/2008 | Chang et al. | 16/367 |
| 2008/0078061 A1 * | 4/2008 | Hsu et al. | 16/367 |
| 2008/0196204 A1 * | 8/2008 | Lin et al. | 16/341 |
| 2008/0263827 A1 * | 10/2008 | Hsu et al. | 16/362 |
| 2008/0282503 A1 * | 11/2008 | Chen | 16/342 |
| 2010/0154166 A1 * | 6/2010 | Chien et al. | 16/250 |

* cited by examiner

*Primary Examiner* — Thomas B Will
*Assistant Examiner* — Emily Morgan
(74) *Attorney, Agent, or Firm* — patenttm.us

(57) ABSTRACT

A hinge is mounted between a cover and a base of an electronic device. A lid covers the hinge and is attached securely to the base. The hinge has an arced surface and a rotating shaft. When the cover is pivoted to a certain angle, the rotating shaft abuts the arced surface to lift up the cover so the cover is selectively distant away from the lid. Therefore, the shape of the electronic device does not need to be disfigured and the cover still does not bump against the lid.

20 Claims, 8 Drawing Sheets

US 7,971,321 B2

HINGE AND AN ELECTRONIC DEVICE WITH THE HINGE

BACKGROUND OF THE INVENTION

1. Field of the Invention

The present invention relates to a hinge and an electronic device with the hinge, especially to the hinge that is mounted between the cover and the base of the electronic device and has a shaft which slides while the cover is pivoted.

2. Description of the Prior Arts

With reference to FIGS. 8 and 9, a conventional electronic device, such as a cell phone and a notebook computer, has a base (90, 90A), a cover (92, 92A), a conventional hinge (91, 91A) and a lid (93, 93A). The conventional hinge (91, 91A) is mounted between the base (90, 90A) and the cover (92, 92A) to allow the cover (92, 92A) pivoting relative to the base (90, 90A). The lid (93, 93A) is mounted on the base (90, 90A) and covers the conventional hinge (91, 91A) to ornament the conventional electronic device.

When the cover (92, 92A) is pivoted relative to the base (90, 90A), the lid (93, 93A) interfere with the end of the cover (92, 92A) to keep the cover (92, 92A) from pivoting. To solve the interference between the cover (92, 92A) and the lid (93, 93A), two conventional ways are shown as follows:

One conventional electronic device is shown in FIG. 8. The end of the lid (93) near the cover (92) has an inclined surface (94). The cover (92) is pivoted along the inclined surface (94) so that the lid (93) does not block the cover (92). However, the inclined surface (94) disfigures the entire appearance of the conventional electronic device.

Another conventional electronic device is shown in FIG. 9. A gap is formed between the cover (92A) and the lid (93A). Therefore, the cover (92A) is kept away from the lid (93A) when the cover (92A) is pivoted. However, the gap not only disfigures the appearance of the conventional electronic device but also increase the volume of the conventional electronic device.

Thus, the conventional ways to solve the interference between the cover (92, 92A) and the lid (93, 93A) disfigure the appearance of the conventional electronic device and increase the volume of the conventional electronic device. To disfigure the appearance of the conventional electronic device and to increase the volume of the conventional electronic device are against the need of the market.

To overcome the shortcomings, the present invention provides a hinge and an electronic device with the hinge to mitigate or obviate the aforementioned problems.

SUMMARY OF THE INVENTION

The main objective of the present invention is to provide a hinge and an electronic device with the hinge that lifts up the cover as desired. The hinge is mounted between a cover and a base of the electronic device. A lid covers the hinge and is attached securely to the base. The hinge has an arced surface and a rotating shaft. When the cover is pivoted to a certain angle, the rotating shaft abuts the arced surface to lift up the cover so the cover is selectively distant away from the lid. Therefore, the shape of the electronic device does not need to be disfigured and the cover still does not bump against the lid.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
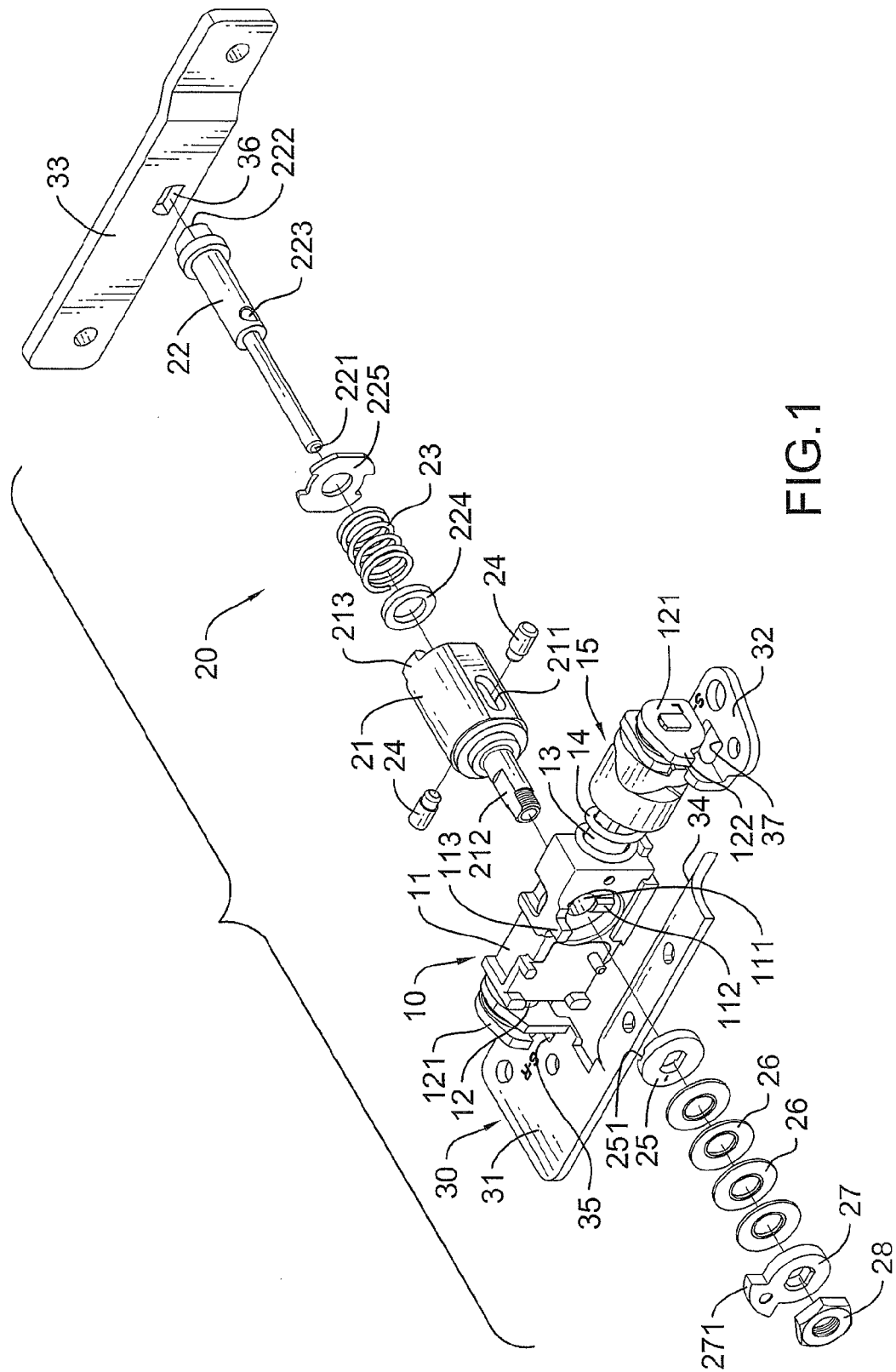
FIG. 1 is a partially exploded perspective view of a hinge in accordance with the present invention.
Figure 2:
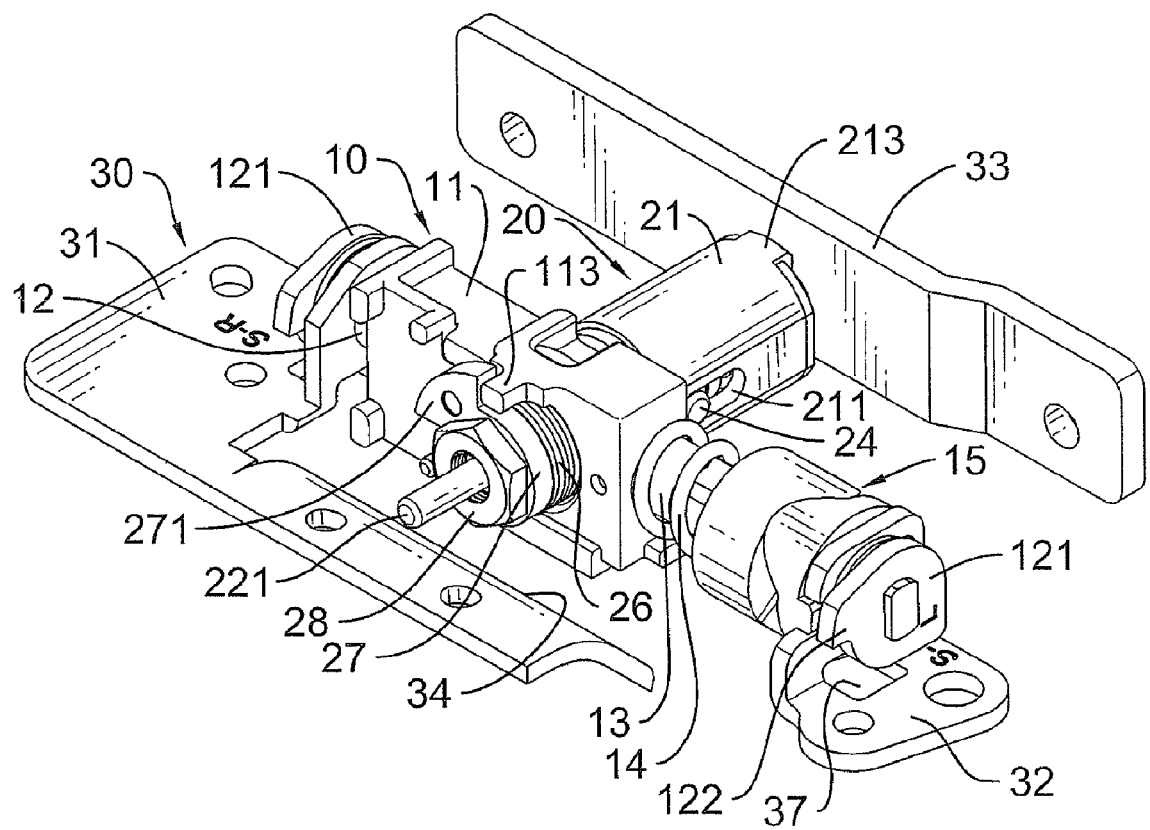
FIG. 2 is a perspective view of the hinge in FIG. 1.

With reference to FIGS. 1 and 2, a hinge in accordance with the present invention comprises a tilting assembly (10), a rotating assembly (20) and a bracket assembly (30).

The tilting assembly (10) comprises a central frame (11), a first tilting shaft (12), a second tilting shaft (13), two limiting washers (121), a spring (14) and a positioning assemblies (15).

The central frame (11) has a first side, a second side, a first end, a second end, a through hole (111), two positioning protrusions (112) and a limiting protrusion (113). The second side is opposite to the first side. The second end is opposite to the first end and is adjacent to the first and second sides. The through hole (111) is formed longitudinally through the first and second sides. The positioning protrusions (112) are formed on the second side and are adjacent to the through hole (111). The limiting protrusion (113) is formed on and protrudes longitudinally from the second side.

The first tilting shaft (12) is formed on and protrudes transversely from the first end of the central frame (11) and may be non-circular in cross section.

The second tilting shaft (13) is formed on and protrudes transversely from the second end of the central frame (11) and may be non-circular in cross section.

The limiting washers (121) are respectively mounted securely on the first and second tilting shafts (12, 13). Each limiting washer (121) has an outer edge and a limiting protrusion (122). The limiting protrusion (122) is formed on and protrudes axially from the outer edge of the limiting washer (121).

The spring (14) is mounted around the second tilting shaft (13).

The positioning assembly (15) is mounted around the second titling shaft (13) against the spring (14) to provide positioning function. The positioning assembly (15) may comprise a rotating positioning washer and a stationary positioning washer that rotate relative to each other and have corresponding positioning protrusions and positioning detent.

The rotating assembly (20) is connected to the tilting assembly (10) and comprises a sleeve (21), a rotating shaft (22), a pushing washer (224), a holding washer (225), a resilient element (23), two pins (24), a positioning washer (25), multiple resilient washers (26), a limiting ring (27) and a fastening ring (28).

The sleeve (21) is hollow, is mounted rotatably through the through hole (111) of the central frame (11) and has a sidewall, a connecting end, a holding end, two slots (211), a mounting rod (212) and two fastening protrusions (213). The holding end is opposite to the connecting end. The slots (211) are formed through the sidewall of the sleeve (21) and are opposite to each other. The mounting rod (212) is formed on and protrudes longitudinally from the connecting end of the sleeve (21), is mounted rotatably through the central frame (11) of the tilting assembly (10), has a non-circular shape in cross section and may have threaded outer wall. The fastening protrusions (213) are formed separately on and protrude longitudinally from the holding end of the sleeve (21).

The rotating shaft (22) is mounted slidably through the sleeve (21) and has an abutting end (221), a mounting end (222) and a mounting hole (223). The abutting end (221) protrudes out from the connecting end of the sleeve (21) and may protrude out from the mounting rod (212). The mounting end (222) protrudes out from the holding end of the sleeve (21). The mounting hole (223) is formed transversely through the rotating shaft (22) and aligns with the slots (211) of the sleeve (21).

The pushing washer (224) is mounted slidably in the sleeve (21) and is mounted around the rotating shaft (22).

The holding washer (225) is mounted securely on the holding end of the sleeve (21), is mounted around the rotating shaft (22) and has two notches being attached securely around the fastening protrusions (213) of the sleeve (21).

The resilient element (23) is mounted in the sleeve (21), is mounted around the rotating shaft (22) and may be mounted between and abut the pushing washer (224) and the holding washer (225).

The pins (24) are mounted respectively through the slots (211) of the sleeve (21), are mounted securely in the mounting hole (223) of the rotating shaft (22), press against the resilient element (23) and may press against the pushing washer (224).

The positioning washer (25) is mounted around the mounting rod (212) of the sleeve (21) and has a non-circular central hole configured to match the shape of the mounting rod (212), an abutting surface and two positioning recesses (251). The abutting surface of the positioning washer (25) faces the second side of the central frame (11). The positioning recesses (251) are formed in the abutting surface of the positioning washer (25) and selectively engage the positioning protrusions (112) of the central frame (11) to provide positioning function.

The resilient washers (26) are mounted around the mounting rod (212) of the sleeve (21) and abut the positioning washer (25).

The limiting ring (27) is mounted securely around the mounting rod (212) of the sleeve (21) and has a non-circular central hole, an annular edge and a limiting protrusion (271). The non-circular central hole engages the mounting rod (212) to mount the limiting ring (27) securely on the mounting rod (212). The limiting protrusion (271) is formed transversely on the annular edge of the limiting ring (27) and selectively abuts the limiting protrusion (113) of the central frame (11) to limit the rotating angle of the sleeve (21).

The fastening ring (28) is mounted securely around the mounting rod (212) of the sleeve (21) to hold the limiting ring (27), the resilient washers (26) and the positioning washer (25), and may be a nut being screwed on the threaded outer wall of the mounting rod (212).

The bracket assembly (30) is connected to the tilting assembly (10) and the rotating assembly (20), and comprises a first tilting bracket (31), a second tilting bracket (32) and a rotating bracket (33).

The first tilting bracket (31) is mounted rotatably around the first tilting shaft (12) and has an edge, a limiting hole (35) and an extending wing. The limiting hole (35) is formed through the first tilting bracket (31) and selectively receives the limiting protrusion (122) of the corresponding limiting washer (121) to limit the rotating angle of the first tilting bracket (31). The extending wing is formed on and protrudes out from the edge of the first tilting bracket (31), corresponds to the central frame (11) and has an arced surface (34). The arced surface (34) faces the rotating shaft (22) and selectively abuts the abutting end (221) of the rotating shaft (22).

The second tilting bracket (32) is mounted rotatably around the second tilting shaft (13) and has a limiting hole (37). The limiting hole (37) is formed through the second tilting bracket (32) and selectively receives the limiting protrusion (122) of the corresponding limiting washer (121) to limit the rotating angle of the second tilting bracket (32).

The rotating bracket (33) is attached securely to the rotating shaft (22) and has a fastening hole (36). The fastening hole (36) is formed through the rotating bracket (33) and engages the mounting end (222) to attach the rotating bracket (33) securely to the rotating shaft (22).

Figure 3:
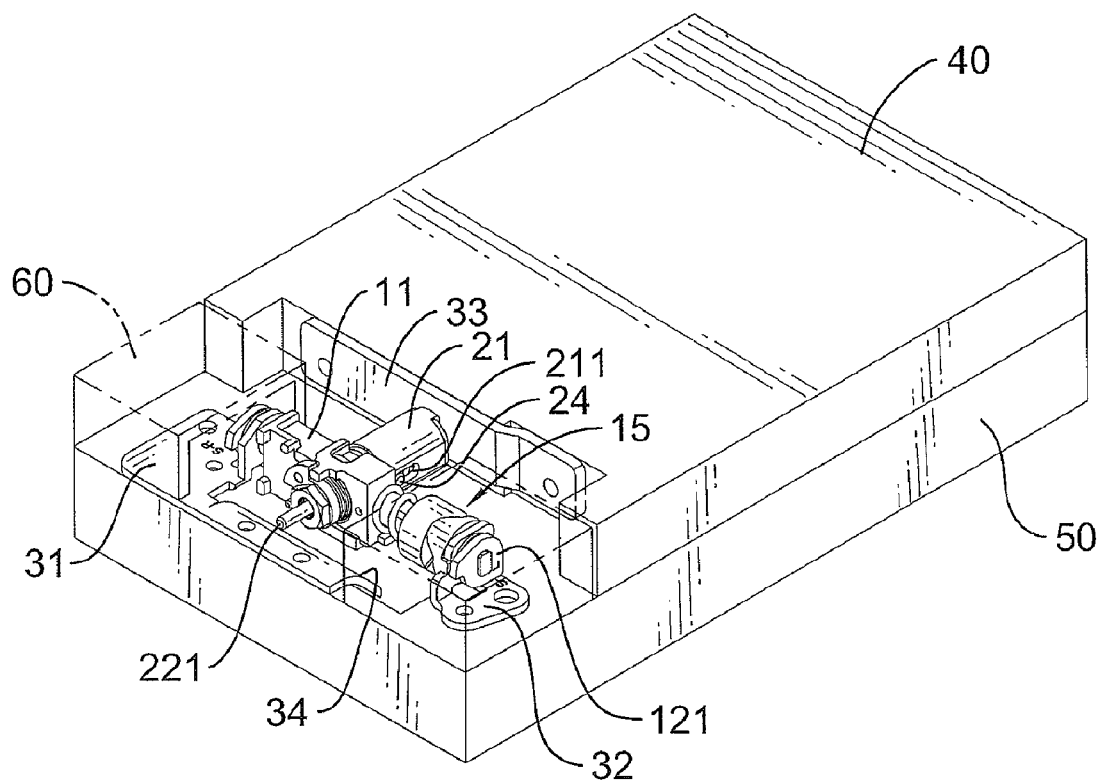
FIG. 3 is a perspective view of an electronic device in accordance with the present invention with the hinge in FIG. 1.
Figure 4:
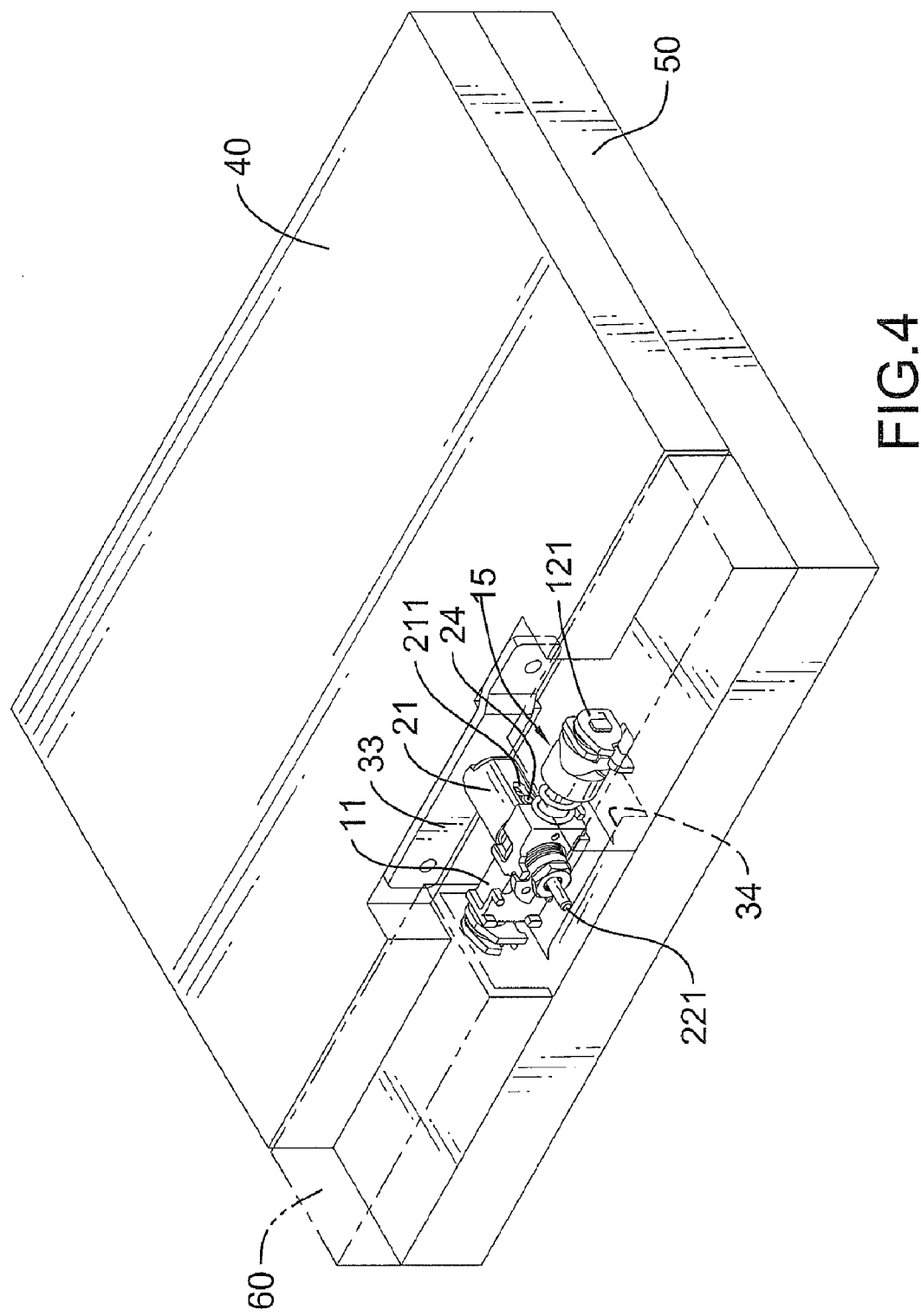
FIG. 4 is a perspective view of another embodiment of an electronic device in accordance with the present invention.
Figure 5:
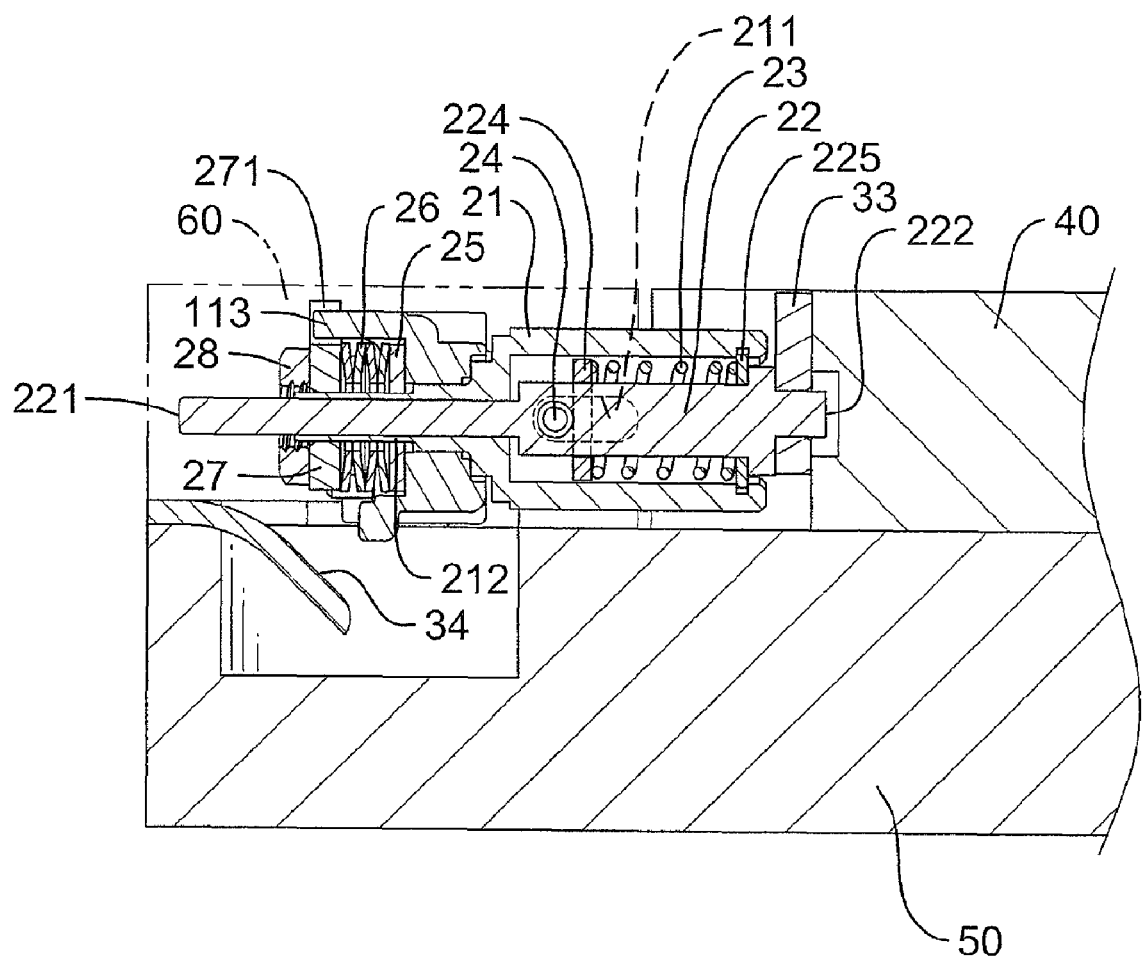
FIG. 5 is an enlarged side view in partial section of the electronic device in FIG. 3.

With further reference to FIGS. 3 to 5, an electronic device in accordance with the present invention comprises a cover (40), a base (50), a hinge as described and a lid (60). The cover (40) is connected pivotally to the base (50). The hinge as described is mounted between the cover (40) and the base (50). The mounted end (222) of the rotating shaft (22) is connected securely to the cover (40) or the rotating bracket (33) may be attached securely to the cover (40). The first and second tilting brackets (31, 32) are attached securely to the base (50). The lid (60) covers the hinge as described and is attached securely to the base (50). The first tilting bracket (31) may be formed on the base (50); that is, the base (50 may be formed with an arced surface facing the rotating shaft (22) to selectively abut the abutting end (221) of the rotating shaft (22).

Figure 6A:
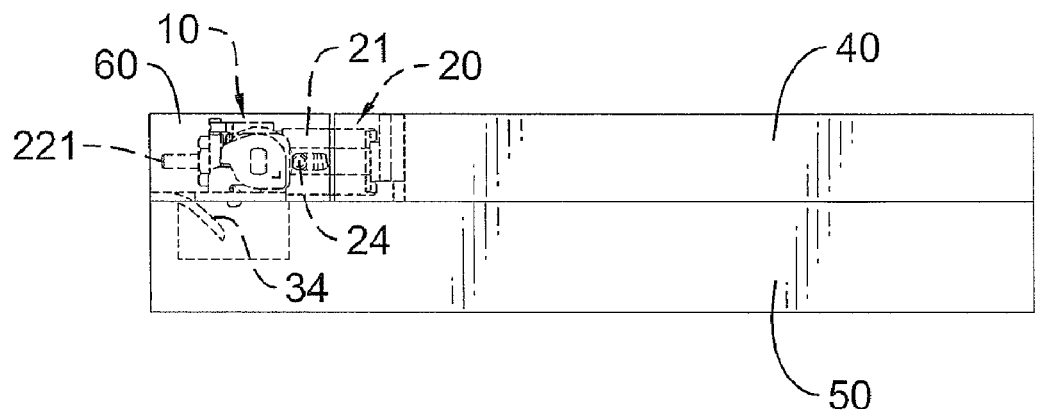
FIGS. 6a and 6b are operational side view of the electronic device in FIG. 3.
Figure 6B:
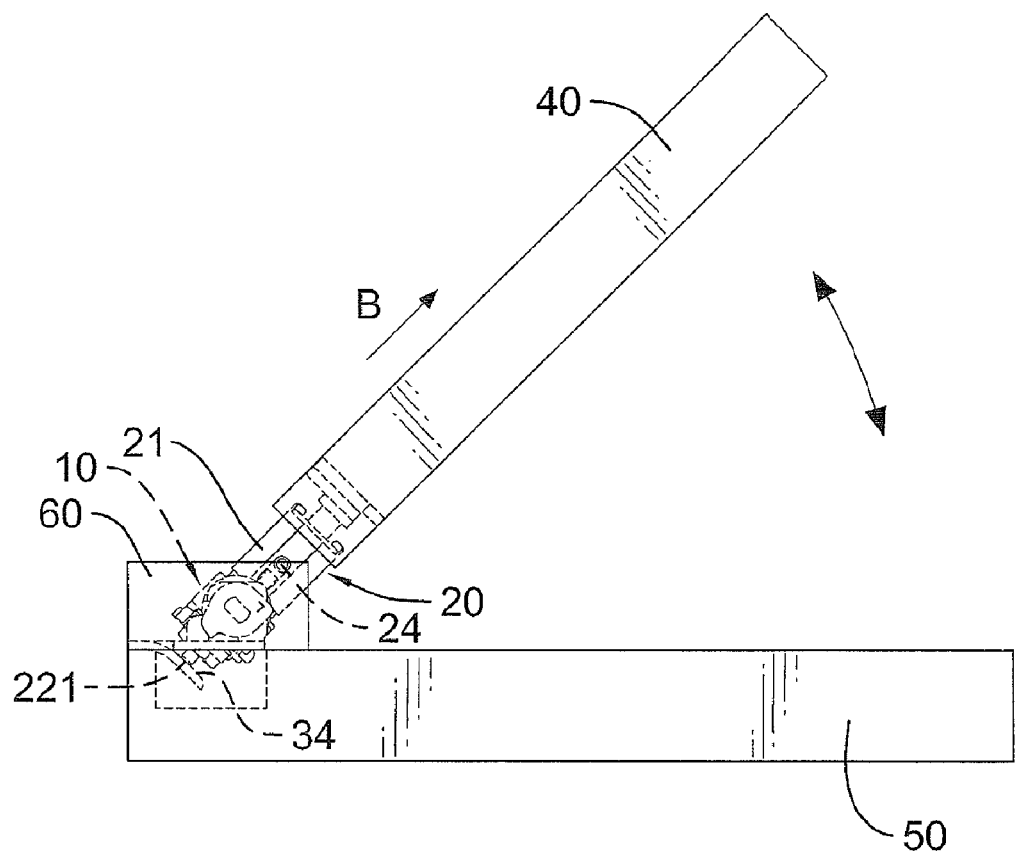
Figure 7A:
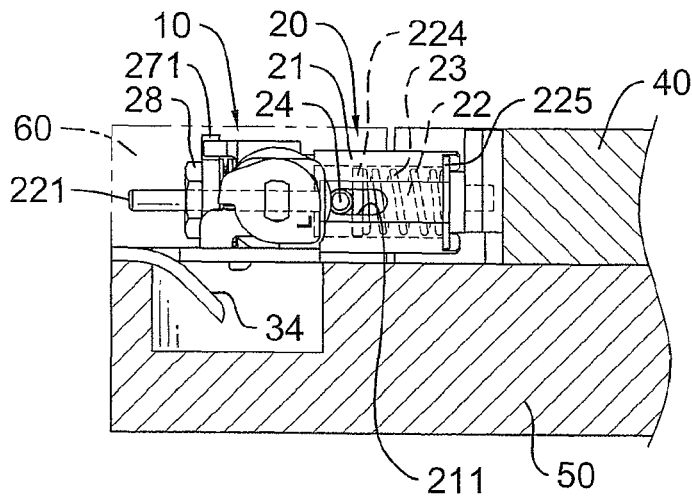
FIGS. 7a, 7b and 7c are operational side view in partial section of the electronic device in FIG. 3.
Figure 7B:
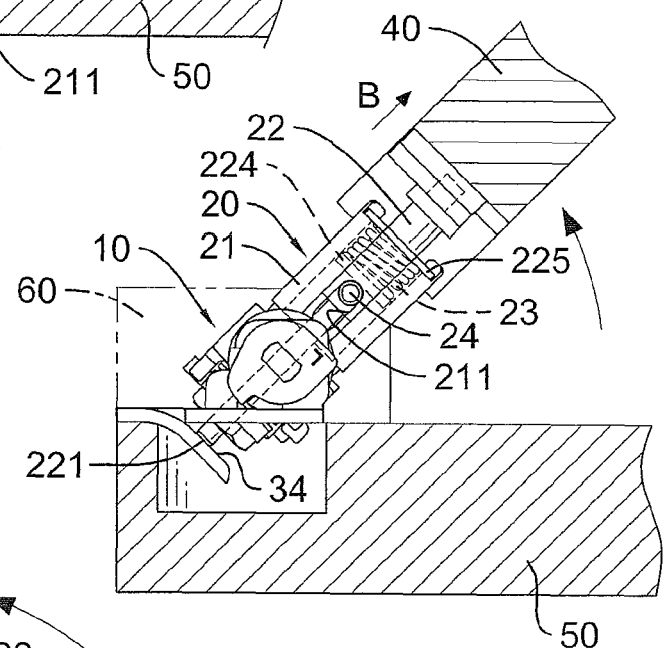
Figure 7C:
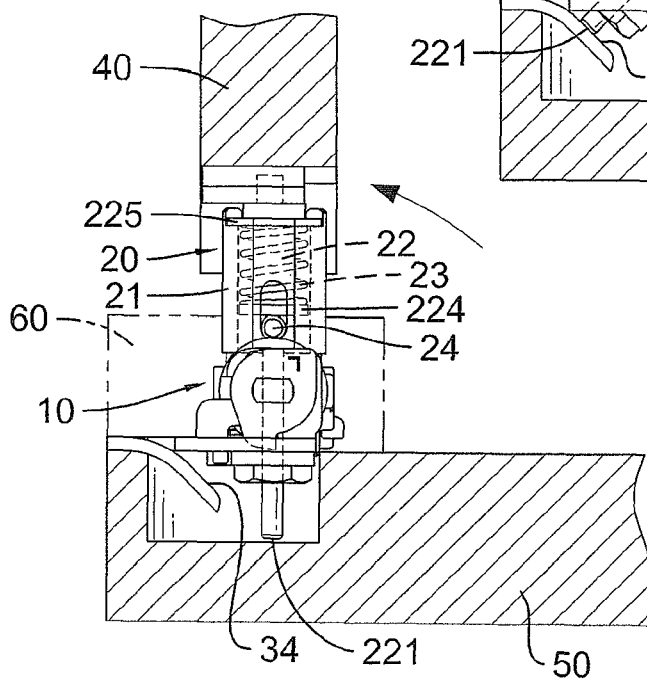
Figure 8:
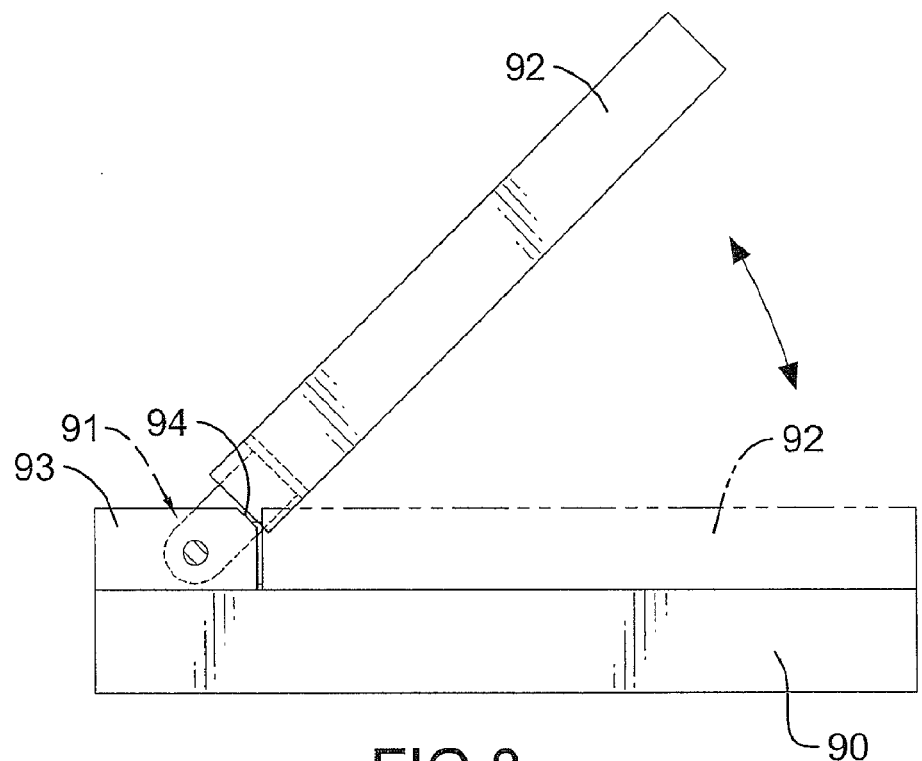
FIG. 8 is an operational side view of a conventional electronic device in accordance with the prior art.
Figure 9:
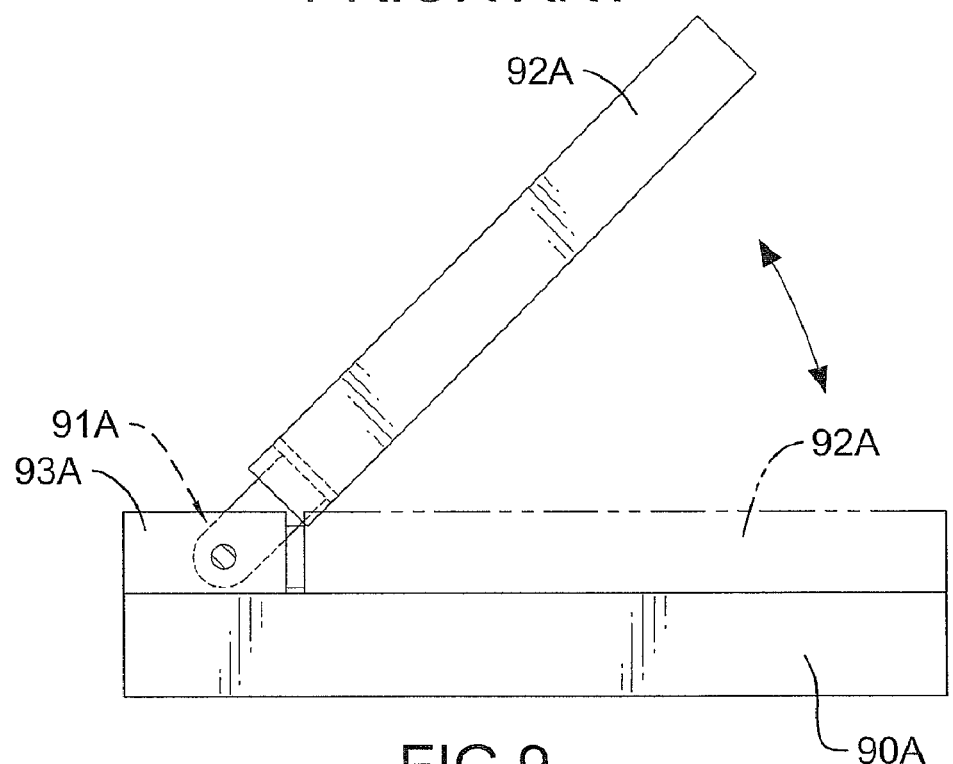
FIG. 9 is an operational side view of another conventional electronic device in accordance with the prior art.

With further reference to FIGS. 6 to 7, the cover (40) is pivoted relative to the base (50). The cover (40) brings the rotating shaft (22) and the central frame (11) to pivot relative to the first and second tilting brackets (31, 32). When the abutting end (221) of the rotating shaft (22) abuts the arced surface (34), the rotating shaft (22) slides toward B direction as shown in FIGS. 6b and 7b to lift up the cover (40). Because the cover (40) is lifted up to be distant from the lid (60), the cover (40) does not bump against the lid (60) when the cover (40) is pivoted.

When the rotating shaft (22) slides toward B direction, the pins (24) is brought to slide in the slots (211). The pins (24) pushes the pushing washer (224) to press the resilient element (23). When the cover (40) is continuously pivoted, the abutting end (221) of the rotating shaft (22) leaves the arced surface (34) so that the force pushing the rotating shaft (22) to slide at B direction is released. Then the resilient element (23) presses the pushing washer (224) to push the pins (24) to slide. The pins (24) are pushed to slide the rotating shaft (22) to the original position. Therefore, the cover (40) is brought back to the original position.

The hinge and the electronic device as described have following advantages. The hinge smoothly lifts the cover (40) up when the cover (40) is pivoted to a certain angle. Therefore, the shape of the electronic device does not need to be disfigured and the cover (40) still does not bump against the lid (60). Furthermore, the electronic device as described can be sized small and can be shaped exquisitely without influence the smoothness when the cover (40) is pivoted.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
   a tilting assembly having
      a central frame having
         a first side;
         a second side being opposite to the first side;
         a first end;
         a second end being opposite to the first end and adjacent to the first and second sides; and
         a through hole being formed longitudinally through the first and second sides;
      a first tilting shaft being formed on and protruding transversely from the first end of the central frame; and
      a second tilting shaft being formed on and protruding transversely from the second end of the central frame;
   a rotating assembly being connected to the tilting assembly and comprising
      a sleeve being hollow, being mounted rotatably through the through hole of the central frame of the tilting assembly and having
         a sidewall;
         a connecting end; and
         a holding end being opposite to the connecting end;
      a rotating shaft being mounted slidably through the sleeve and having
         an abutting end protruding out from the connecting end of the sleeve; and
         a mounting end protruding out from the holding end of the sleeve; and
      a resilient element being mounted in the sleeve and being mounted around the rotating shaft; and
   a bracket assembly being connected to the tilting assembly and the rotating assembly and comprising
      a first tilting bracket being mounted rotatably around the first tilting shaft and having
         an edge; and
         an extending wing being formed on and protruding out from the edge of the first tilting bracket, corresponding to the central frame and having an arced surface facing the rotating shaft and selectively abutting the abutting end of the rotating shaft; and
      a second tilting bracket being mounted rotatably around the second tilting shaft,
   wherein the arced surface slides the rotating shaft during the rotation of the tilting assembly.

2. The hinge as claimed in claim 1, wherein
   the sleeve has two slots being formed through the sidewall of the sleeve and being opposite to each other;
   the rotating shaft has a mounting hole being formed transversely through the rotating shaft and aligning with the slots of the sleeve; and
   the rotating assembly has two pins being mounted respectively through the slots of the sleeve, being mounted securely in the mounting hole of the rotating shaft and pressing against the resilient element.

3. The hinge as claimed in claim 2, wherein
   the rotating assembly has
      a pushing washer being mounted slidably in the sleeve and being mounted around the rotating shaft; and
      a holding washer being mounted securely on the holding end of the sleeve and being mounted around the rotating shaft;
   the resilient element is mounted between and abuts the pushing washer and the holding washer; and
   the pins press against the pushing washer.

4. The hinge as claimed in claim 1, wherein the tilting assembly has
   a spring being mounted around the second tilting shaft; and
   a positioning assembly being mounted around the second tilting shaft against the spring of the tilting assembly to provide positioning function.

5. The hinge as claimed in claim 3, wherein the tilting assembly has
   a spring being mounted around the second tilting shaft; and
   a positioning assembly being mounted around the second tilting shaft against the spring of the tilting assembly to provide positioning function.

6. The hinge as claimed in claim 1, wherein
   the tilting assembly has two limiting washers being respectively mounted securely on the first and second tilting shafts, and each limiting washer has
      an outer edge; and
      a limiting protrusion being formed on and protruding axially from the outer edge of the limiting washer;
   the first tilting bracket has a limiting hole being formed through the first tilting bracket and selectively receiving the limiting protrusion of a corresponding limiting washer; and
   the second tilting bracket has a limiting hole being formed through the second tilting bracket and selectively receiving the limiting protrusion of a corresponding limiting washer.

7. The hinge as claimed in claim 5, wherein
   the tilting assembly has two limiting washers being respectively mounted securely on the first and second tilting shafts, and each limiting washer has
      an outer edge; and
      a limiting protrusion being formed on and protruding axially from the outer edge of the limiting washer;
   the first tilting bracket has a limiting hole being formed through the first tilting bracket and selectively receiving the limiting protrusion of a corresponding limiting washer; and
   the second tilting bracket has a limiting hole being formed through the second tilting bracket and selectively receiving the limiting protrusion of a corresponding limiting washer.

8. The hinge as claimed in claim 1, wherein
   the central frame of the tilting assembly has
      two positioning protrusions being formed on the second side and being adjacent to the through hole of the central frame; and
      a limiting protrusion being formed on and protruding longitudinally from the second side;
   the sleeve has a mounting rod being formed on and protruding longitudinally from the connecting end of the sleeve, being mounted rotatably through the central frame of the tilting assembly and having a non-circular shape in cross section; and
   the rotating assembly has
      a positioning washer being mounted around the mounting rod of the sleeve and having a non-circular central hole configured to match the shape of the mounting rod of the sleeve;
an abutting surface facing the second side of the central frame; and
two positioning recesses being formed in the abutting surface of the positioning washer and selectively engaging the positioning protrusions of the central frame;
multiple resilient washers being mounted around the mounting rod of the sleeve and abutting the positioning washer;
a limiting ring being mounted securely around the mounting rod of the sleeve and having
a non-circular central hole engaging the mounting rod of the sleeve;
an annular edge; and
a limiting protrusion being formed transversely on the annular edge of the limiting ring and selectively abutting the limiting protrusion of the central frame; and
a fastening ring being mounted securely around the mounting rod of the sleeve to hold the limiting ring and the resilient washers and the positioning washer.

9. The hinge as claimed in claim 7, wherein
the central frame of the tilting assembly has
two positioning protrusions being formed on the second side and being adjacent to the through hole of the central frame; and
a limiting protrusion being formed on and protruding longitudinally from the second side;
the sleeve has a mounting rod being formed on and protruding longitudinally from the connecting end of the sleeve, being mounted rotatably through the central frame of the tilting assembly and being non-circular in cross section; and
the rotating assembly has
a positioning washer being mounted securely around the mounting rod of the sleeve and having
a non-circular central hole engaging the mounting rod of the sleeve;
an abutting surface facing the second side of the central frame; and
two positioning recesses being formed in the abutting surface of the positioning washer and selectively engaging the positioning protrusions of the central frame;
multiple resilient washers being mounted around the mounting rod of the sleeve and abutting the positioning washer;
a limiting ring being mounted securely around the mounting rod of the sleeve and having
a non-circular central hole engaging the mounting rod of the sleeve;
an annular edge; and
a limiting protrusion being formed transversely on the annular edge of the limiting ring and selectively abutting the limiting protrusion of the central frame; and
a fastening ring being mounted securely around the mounting rod of the sleeve to hold the limiting ring and the resilient washers and the positioning washer.

10. The hinge as claimed in claim 1, wherein the bracket assembly has a rotating bracket being attached securely to the rotating shaft.

11. The hinge as claimed in claim 9, wherein the bracket assembly has a rotating bracket being attached securely to the rotating shaft.

12. All electronic device comprising:
a base;
a cover being connected pivotally to the base;
a hinge being connected between the base and the cover and comprising
a tilting assembly having
a central frame having
a first side;
a second side being opposite to the first side;
a first end;
a second end being opposite to the first end and adjacent to the first and second sides; and
a through hole being formed longitudinally through the first and second sides;
a first tilting shaft being formed on and protruding transversely from the first end of the central frame; and
a second tilting shaft being formed on and protruding transversely from the second end of the central frame;
a rotating assembly being connected to the tilting assembly and comprising
a sleeve being hollow, being mounted rotatably through the through hole of the central frame of the tilting assembly and having
a sidewall;
a connecting end; and
a holding end being opposite to the connecting end;
a rotating shaft being mounted slidably through the sleeve and having
an abutting end protruding out from the connecting end of the sleeve; and
a mounting end protruding out from the holding end of the sleeve and being connected securely to the cover; and
a resilient element being mounted in the sleeve and being mounted around the rotating shaft; and
a bracket assembly being connected to the tilting assembly and the rotating assembly and comprising
a first tilting bracket being formed on the base, being mounted rotatably around the first tilting shaft and having
an edge; and
an extending wing being formed on and protruding out from the edge of the first tilting bracket, corresponding to the central frame and having an arced surface facing the rotating shaft and selectively abutting the abutting end of the rotating shaft; and
a second tilting bracket being mounted rotatably around the second tilting shaft,
wherein the arced surface slides the rotating shaft during the rotation of the tilting assembly; and
a lid covering the hinge and being attached securely to the base.

13. The electronic device as claimed in claim 12, wherein the bracket assembly has a rotating bracket being attached securely to the rotating shaft and being attached securely to the cover.

14. The electronic device as claimed in claim 13, wherein
the sleeve has two slots being formed through the sidewall of the sleeve and being opposite to each other;
the rotating shaft has a mounting hole being formed transversely through the rotating shaft and aligning with the slots of the sleeve; and
the rotating assembly has two pins being mounted respectively through the slots of the sleeve, being mounted securely in the mounting hole of the rotating shaft and pressing against the resilient element.

15. The electronic device as claimed in claim 14, wherein the rotating assembly has
   - a pushing washer being mounted slidably in the sleeve and being mounted around the rotating shaft; and
   - a holding washer being mounted securely on the holding end of the sleeve and being mounted around the rotating shaft;
   - the resilient element is mounted between and abuts the pushing washer and the holding washer; and
   - the pins press against the pushing washer.

16. The electronic device as claimed in claim 12, wherein the tilting assembly has
   - a spring being mounted around the second tilting shaft; and
   - a positioning assembly being mounted around the second titling shaft against the spring of the tilting assembly to provide positioning function.

17. The electronic device as claimed in claim 15, wherein the tilting assembly has
   - a spring being mounted around the second tilting shaft; and
   - a positioning assembly being mounted around the second titling shaft against the spring of the tilting assembly to provide positioning function.

18. The electronic device as claimed in claim 12, wherein the tilting assembly has two limiting washers being respectively mounted securely on the first and second tilting shafts, and each limiting washer has
   - an outer edge; and
   - a limiting protrusion being formed on and protruding axially from the outer edge of the limiting washer;
   - the first tilting bracket has a limiting hole being formed through the first tilting bracket and selectively receiving the limiting protrusion of a corresponding limiting washer; and
   - the second tilting bracket has a limiting hole being formed through the second tilting bracket and selectively receiving the limiting protrusion of a corresponding limiting washer.

19. The electronic device as claimed in claim 17, wherein the tilting assembly has two limiting washers being respectively mounted securely on the first and second tilting shafts, and each limiting washer has
   - an outer edge; and
   - a limiting protrusion being formed on and protruding axially from the outer edge of the limiting washer;
   - the first tilting bracket has a limiting hole being formed through the first tilting bracket and selectively receiving the limiting protrusion of a corresponding limiting washer; and
   - the second tilting bracket has a limiting hole being formed through the second tilting bracket and selectively receiving the limiting protrusion of a corresponding limiting washer.

20. The electronic device as claimed in claim 19, wherein the central frame of the tilting assembly has
   - two positioning protrusions being formed on the second side and being adjacent to the through hole of the central frame; and
   - a limiting protrusion being formed on and protruding longitudinally from the second side;
   - the sleeve has a mounting rod being formed on and protruding longitudinally from the connecting end of the sleeve, being mounted rotatably through the central frame of the tilting assembly and having a non-circular shape in cross section; and
   - the rotating assembly has
     - a positioning washer being mounted around the mounting rod of the sleeve and having
       - a non-circular central hole configured to match the shape of the mounting rod of the sleeve;
       - an abutting surface facing the second side of the central frame; and
       - two positioning recesses being formed in the abutting surface of the positioning washer and selectively engaging the positioning protrusions of the central frame;
     - multiple resilient washers being mounted around the mounting rod of the sleeve and abutting the positioning washer;
     - a limiting ring being mounted securely around the mounting rod of the sleeve and having
       - a non-circular central hole engaging the mounting rod of the sleeve;
       - an annular edge; and
       - a limiting protrusion being formed transversely on the annular edge of the limiting ring and selectively abutting the limiting protrusion of the central frame; and
     - a fastening ring being mounted securely around the mounting rod of the sleeve to hold the limiting ring and the resilient washers and the positioning washer.

* * * * *